United States Patent …

(12) United States Patent
Wallen et al.

(10) Patent No.: US 8,936,460 B2
(45) Date of Patent: Jan. 20, 2015

(54) EXTRUSION HEAD WITH HIGH VOLUME RESERVOIR

(75) Inventors: John Michael Wallen, Lindsborg, KS (US); James W. Nixon, McPherson, KS (US); Bradley M. Eisenbarth, McPherson, KS (US)

(73) Assignee: American Maplan Corporation, McPherson, KS (US)

( * ) Notice: Subject to any disclaimer, the term of this patent is extended or adjusted under 35 U.S.C. 154(b) by 528 days.

(21) Appl. No.: 12/887,084

(22) Filed: Sep. 21, 2010

(65) Prior Publication Data

US 2011/0095450 A1    Apr. 28, 2011

Related U.S. Application Data

(60) Provisional application No. 61/244,499, filed on Sep. 22, 2009.

(51) Int. Cl.
*B29C 47/20* (2006.01)
*B29C 47/22* (2006.01)
*B29C 47/08* (2006.01)
B29C 47/00 (2006.01)
B29L 23/00 (2006.01)

(52) U.S. Cl.
CPC ........... *B29C 47/225* (2013.01); *B29C 47/0869* (2013.01); *B29C 47/0023* (2013.01); *B29C 47/0026* (2013.01); *B29C 47/20* (2013.01); *B29L 2023/22* (2013.01)
USPC ......... 425/186; 425/192 R; 425/380; 425/467

(58) Field of Classification Search
USPC ...................... 425/186, 192 R, 380, 381, 467
See application file for complete search history.

(56) References Cited

U.S. PATENT DOCUMENTS

| | | | |
|---|---|---|---|
| 2,913,763 A * | 11/1959 | Longstreth et al. | 425/467 |
| 3,649,148 A | 3/1972 | Waltman et al. | |
| 3,899,276 A | 8/1975 | Sokolow | |
| 4,305,703 A | 12/1981 | Lupke et al. | |
| 5,045,254 A * | 9/1991 | Peelman et al. | 264/48 |
| 5,102,602 A | 4/1992 | Ziegler | |
| 5,776,519 A | 7/1998 | Flammer | |
| 2002/0109259 A1 * | 8/2002 | Groeblacher et al. | 264/177.1 |
| 2005/0206031 A1 | 9/2005 | Groeblacher et al. | |

FOREIGN PATENT DOCUMENTS

| | | |
|---|---|---|
| JP | 51-9148 | 1/1976 |
| JP | 08-011191 | 1/1996 |
| WO | WO 99/44805 | 9/1999 |

* cited by examiner

*Primary Examiner* — Yogendra Gupta
*Assistant Examiner* — Joseph Leyson
(74) *Attorney, Agent, or Firm* — Hamilton, Brook, Smith & Reynolds, P.C.

(57) ABSTRACT

An extrusion head for an extrusion apparatus can include a spider for supporting a central mandrel. A high volume reservoir can be mounted to the spider on a downstream side of the spider. The central mandrel can extend longitudinally into the high volume reservoir. The high volume reservoir can have an axially straight annular conduit with a length L and an outer diameter OD. The annular conduit can have an L to OD ratio of about 1:1. A set of dies can be mounted downstream of the high volume reservoir, whereby the high volume reservoir reduces pressure and promotes homogenization of molten polymer flowing therethrough, before reaching the set of dies.

11 Claims, 5 Drawing Sheets

EXTRUSION HEAD WITH HIGH VOLUME RESERVOIR

RELATED APPLICATION

This application claims the benefit of U.S. Provisional Application No. 61/244,499, filed on Sep. 22, 2009. The entire teachings of the above application is incorporated herein by reference.

BACKGROUND

An extruded plastic product, such as a pipe, can be formed in an extrusion apparatus, by forcing molten polymer or plastic under pressure through a die to form the extruded product. The rotating screw of the extrusion apparatus can form pressure waves in the molten polymer, which can remain present while passing through the dies. Such pressure waves can leave distinct visual screw marks or cause defects on or in the extruded product, which are typically undesirable.

SUMMARY

The present invention can provide an extrusion head for an extrusion apparatus which can reduce pressure waves and increase homogenization or mixing of the molten polymer before reaching the dies, thereby reducing or eliminating undesirable marks or defects on or in extruded products. The extrusion head can include a spider for supporting a central mandrel. A high volume reservoir can be mounted to the spider on a downstream side of the spider. The central mandrel can extend longitudinally into the high volume reservoir. The high volume reservoir can have an axially straight annular conduit with a length L and an outer diameter OD. The annular conduit can have an L to OD ratio of about 1:1. A set of dies can be mounted downstream of the high volume reservoir, whereby the high volume reservoir reduces pressure and promotes homogenization of molten polymer flowing therethrough, before reaching the set of dies.

In particular embodiments, the annular conduit can have an annular gap G, and an L to G ratio between about 3 and 4 to 1. The annular conduit can also have an inner diameter ID, and an OD to ID ratio over about 2:1. The set of dies can have a length $L_1$, and an L to $L_1$ ratio less than about 1:2. The extrusion head can further include a die adjustment assembly mounted to a downstream side of the high volume reservoir. The die adjustment assembly can be configured such that once adjusted into a centered position, an outer die portion of any set of mating dies can be secured to the die adjustment assembly in a precentered position. The die adjustment assembly and the outer die portion can include mating centering structures. The die adjustment assembly can include a mounting ring that is adjustably lockable relative to the high volume reservoir. The mounting ring can have a centering locating diameter capable of engaging a mating centering locating diameter on an outer die portion selected from any set of mating dies in the precentered position once the mounting ring is locked in a position that centers one selected outer die portion.

The present invention can also provide an extrusion head including a high volume reservoir. A central mandrel can extend longitudinally into the high volume reservoir forming an axially straight annular conduit through the high volume reservoir with a length L, an outer diameter OD, and an L to OD ratio at least about 1:1. A die mount can be mounted to a downstream side of the high volume reservoir for mounting a set of dies thereto. The high volume reservoir reduces pressure and promotes homogenization of molten polymer flowing therethrough before reaching the die mount.

In particular embodiments, the annular conduit can have an annular gap G, and an L to G ratio between about 3 and 4 to 1. The annular conduit can also have an inner diameter ID, and an OD to ID ratio over about 2:1. A set of dies having an inner die portion and an outer die portion can be mounted to the die mount. The inner die portion can be mounted to the central mandrel and the outer die portion can be mounted to a die adjustment assembly. The set of dies can have a length $L_1$, and an L to $L_1$ ratio less than about 1:2. The die adjustment assembly can be configured such that the once adjusted in a centered position, an outer die portion of any set of mating dies can be secured to the die adjustment assembly in a precentered position. The die adjustment assembly can include a mounting ring that is adjustably lockable relative to the high volume reservoir. The mounting ring can have a centering locating diameter capable of engaging a mating centering locating diameter on an outer die portion selected from any set of mating dies in the precentered position once the mounting ring is locked in a position that centers one selected outer die portion.

The present invention can also provide a method of homogenizing molten polymer in an extrusion head. A spider can support a central mandrel. A high volume reservoir can be mounted to the spider on a downstream side of the spider. The central mandrel can extend longitudinally into the high volume reservoir. The high volume reservoir can have an axially straight annular conduit with a length $L_1$, an outer diameter OD, and an L to OD ratio about 1:1. The high volume reservoir can reduce pressure and promote homogenization of the molten polymer flowing therethrough before reaching a set of dies mounted downstream of the high volume reservoir.

In particular embodiments, the annular conduit can be provided with an annular gap G, and an L to G ratio between about 3 and 4 to 1. The annular conduit can also be provided with an inner diameter ID, and an OD to ID ratio over about 2:1. The set of dies can be provided with a length $L_1$, and an L to $L_1$ ratio less than about 1:2. A die adjustment assembly can be mounted to a downstream side of the high volume reservoir. The die adjustment assembly can be configured such that once adjusted into a centered position, and outer die portion of any set of mating dies can be secured to the die adjustment assembly in a precentered position. The die adjustment assembly and the outer die portion can be provided with mating centering structures. The die adjustment assembly can be provided with a mounting ring that is adjustably lockable relative to the high volume reservoir. The mounting ring can have a centering locating diameter capable of engaging a mating centering diameter on an outer die portion selected from any set of mating dies in the precentered position once the mounting ring is locked in a position that centers one selected outer die portion.

The present invention can also provide a method of homogenizing molten polymer in an extrusion head. A high volume reservoir can be provided with a central mandrel extending into the high volume reservoir, forming an axially straight annular conduit through the high volume reservoir with a length $L_1$, an outer diameter OD, and an L to OD ratio at least about 1:1. A die mount can be mounted to a downstream side of the high volume reservoir for mounting a set of dies thereto. The high volume reservoir can reduce pressure and promote homogenization of molten polymer flowing therethrough before reaching the die mount.

In particular embodiments, the annular conduit can be provided with an annular gap G, and an L to G ratio between about 3 and 4 to 1. The annular conduit can also be provided with an inner diameter ID, and an OD to ID ratio over about 2:1. A set of dies having an inner die portion and an outer die portion can be mounted to the die mount. The inner die portion can be mounted to the central mandrel and the outer die portion can be mounted to a die adjustment assembly. The set of dies can be provided with a length $L_1$, and an L to $L_1$ ratio less than about 1:2. The die adjustment assembly can be configured such that once adjusted in a centered position, an outer die portion of any set of mating dies can be secured to the die adjustment assembly in a precentered position. The die adjustment assembly can be provided with a mounting ring that is adjustably lockable relative to the high volume reservoir. The mounting ring can have a centering locating diameter capable of engaging a mating centering locating diameter on an outer die portion selected from any set of mating dies in the precentered position once the mounting ring is locked in a position that centers one selected outer die portion.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
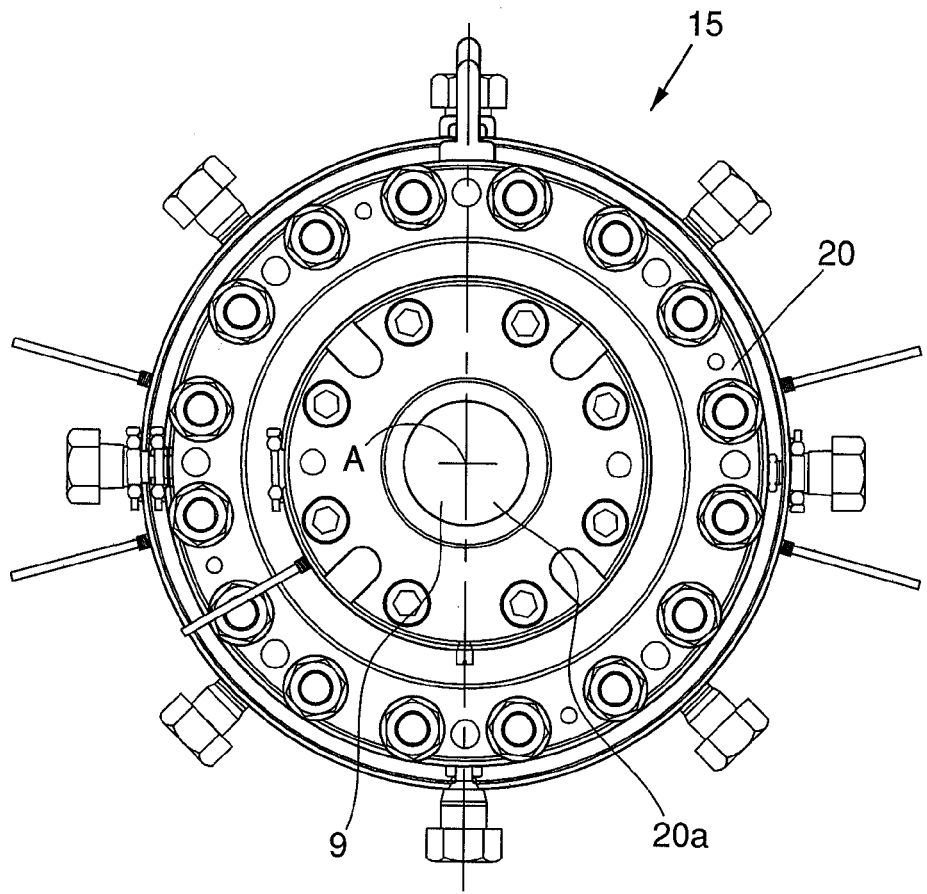
FIG. 1 is an upstream end view of an embodiment of an extrusion head in the present invention.
Figure 2:
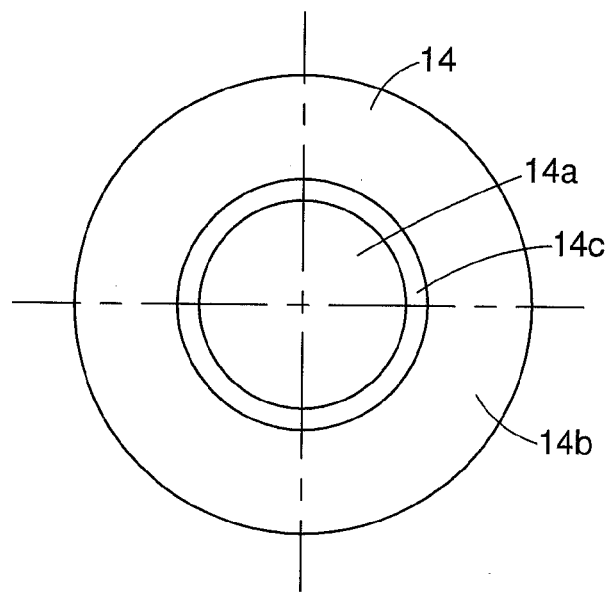
FIG. 2 is a downstream end view of an embodiment of the extrusion head of FIG. 1 showing the dies.
Figure 3:
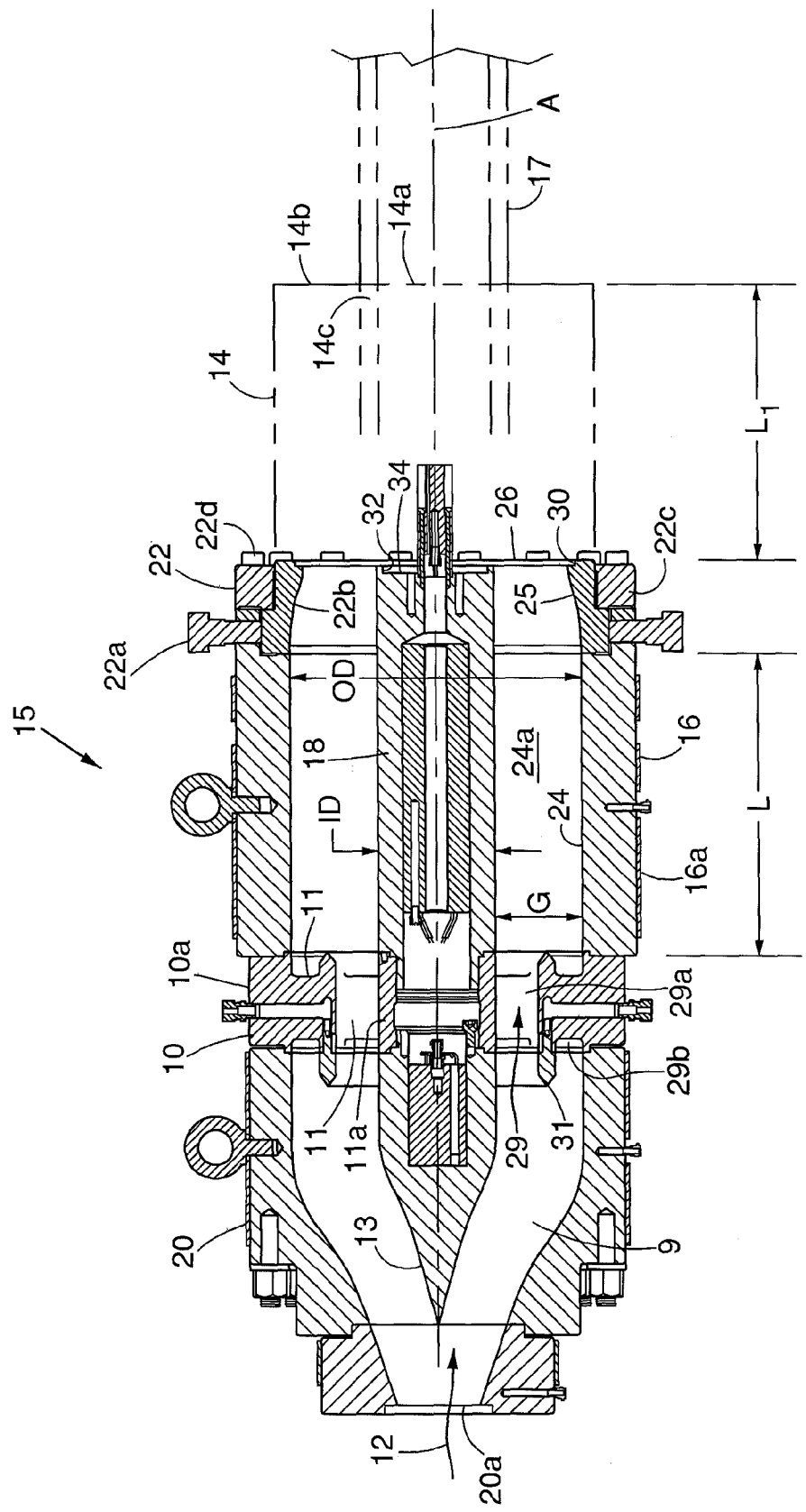
FIG. 3 is a side sectional view of the extrusion head of FIG. 1.

FIGS. 1-3 disclose an embodiment of an extrusion head 15 on an extrusion apparatus in the present invention. The extrusion head 15 has a longitudinal or axial flow passage 9 extending along longitudinal axis A which receives molten polymer 12 through an inlet 20a to an inlet section 20. The molten polymer 12 is extruded through a set of dies 14 positioned about axis A, to produce an extruded product or profile 17, such as pipe.

Extrusion head 15 can have a spider 10 connected to the downstream side of the inlet section 20 along axis A. The spider 10 can be typical as known in the art, and can have a series of spaced radially extending webs 11 connected to and extending between an outer wall, ring or housing 10a which can be round, and a central inner hub 11a which can also be round. A generally annular flow passage 29 can extend between the outer housing 10a and the inner hub 11a, and around the webs 11, thereby allowing the polymer 12 to flow through the spider 10. In some embodiments, an annular ring portion 31 can be position concentrically about axis A between the hub 11a and the outer wall 10a and connected to the webs 11, thereby forming inner 29a and outer 29b generally annular flow regions. The webs 11 in the inner 29a and outer 29b annular flow regions can be aligned with each other, or can be offset. The upstream side of the hub 11a can be connected to a pointed flow tip 13 which can facilitate the flow of the polymer 12 around the hub 11a. The outer diameter of the flow passage 9 can expand, moving from the flow tip 13 in the direction of the hub 11a, and becoming generally annular in shape. The downstream side of the hub 11a of the spider 10 can be connected to and support a mandrel 18 extending longitudinally along axis A in the center of the flow of the polymer 12 through flow passage 9. The polymer 12 in the flow passage 9 flows around the webs 11 and hub 11a of the spider 10 through flow passage 29 before reaching and flowing around the mandrel 18. The mandrel 18 can be generally round or cylindrically elongate in shape, with a constant diameter, and can be the same diameter as the hub 11a, for smooth flow transition.

A reservoir section 16 through which the polymer 12 can flow, can be connected to the downstream side of the spider 10 along axis A, with the mandrel 18 extending longitudinally therein or therethrough. The set of dies 14 can have inner 14a and outer 14b die portions that are mounted to the mandrel 18, and an adjustment assembly 22 at the downstream side of the reservoir section 16, with a gap 14c therebetween for extruding profile 17 therethrough. The reservoir section 16 spaces the spider 10 from the dies 14 and can have a large or high volume.

Figure 4:
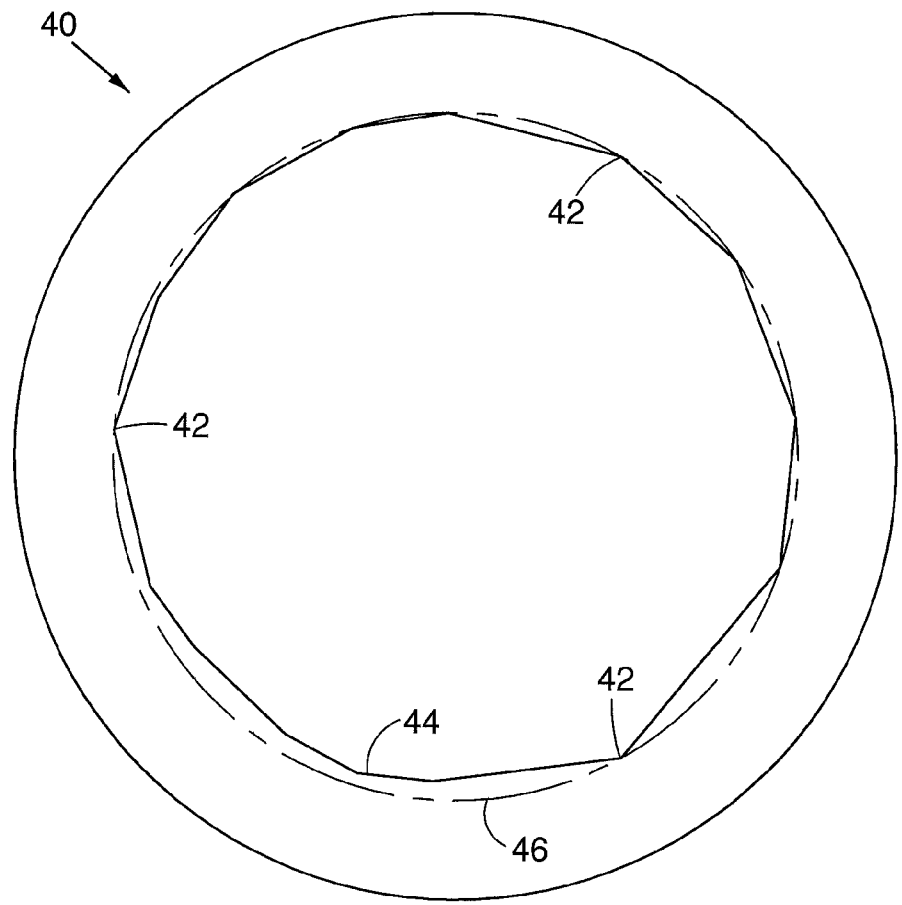
FIG. 4 is a schematic drawing of spider lines on an extruded profile or product, such as a pipe.

Referring to FIG. 4, in the prior art, polymer flowing around the webs of a spider can often form spider or parting lines on an extruded profile such as a pipe. FIG. 4 shows an example of a profile or product 40, such as a pipe, having an inner surface 44 with spider lines 42, and a round theoretical inner surface 46 for comparison.

In the present invention, the reservoir section 16 can reduce or prevent spider lines caused by webs 11 on an extruded profile 17, by having a configuration which promotes better or more complete mixing of polymer 12 back together after being separated by the webs 11 of spider 10 before the polymer 12 reaches the dies 14. The reservoir section 16 can have an outer wall, ring or housing 16a, which can be round and form an axially long straight large volume conduit section 24 with an axial length "L" that is long and wide enough to achieve such mixing. The mandrel 18 can extend longitudinally through the conduit section 24 of the reservoir section 16 along axis A to form an axially straight annular large volume space, region, reservoir, conduit or passage 24a through the reservoir section 16 between the outer wall 16a and the mandrel 18. The outer wall 16a can form a constant outer diameter OD and the mandrel 18 can form a constant inner diameter ID, thereby forming a constant size annular conduit 24a with an annular gap G between the upstream and downstream ends of the reservoir section 16. The length L, the outer diameter OD and the inner diameter ID can be sized relative to each other to provide the conduit section 24 with a long large volume annular conduit 24a.

In some embodiments, the length L to OD ratio of the annular conduit 24a of the conduit section 24 of reservoir section 16 can be about 1:1 or can be greater, the OD to ID ratio can be over 2 (2:1), for example, about 2.5 (2.5:1) or about 2.6 (2.6:1), and the length L to annular gap G ratio can be about 3-4 to 1 (3:1 to 4:1), such as 3.25 (3.25:1) or 3.36 (3.36:1). For example, in some embodiments, the annular conduit 24a can have an axial length L, about 13 inches long, an outer diameter OD of about 13 inches and an inner diameter ID of about 5 inches, resulting in an annular gap G of about 4 inches. This can also result in a volume which can be over 1200 in$^3$, for example, over 1400 in$^3$, such as 1470 in$^3$. In one embodiment, for example, the length L can be 13.25 inches, the OD can be 12.996 inches, the ID can be 5.126 inches, the annular gap can be 3.935 inches, and the volume of the annular conduit 24a can be 1484.287 in$^3$.

The large gap G formed by a large difference between the outer diameter OD and the inner diameter ID in the reservoir section 16 can provide a large enough space or volume in the radial direction to allow the polymer 12 to move radially between the OD and the ID, thereby allowing for mixing in the radial direction. This can also promote mixing in a circumferential, rotational or lateral direction. The annular ring 31 of the spider 10 can direct two concentric annular flows of polymer 12 into the annular conduit 24a which can promote radial movement and mixing of the polymer 12. In addition, the long length L can provide a sufficient time and distance or length through reservoir section 16 to allow thorough mixing of the polymer 12 to occur. As a result, the large volume annular conduit 24a can provide sufficient space and length for viscous fluid such as molten polymer 12 to undergo increased mixing, and the large volume can also reduce, lower, relax or release the pressure of the polymer 12, before entering the dies 14. Reduced pressure can promote mixing and can also dissipate pressure waves caused by the rotating screw, producing an even flow. As a result, visual marks or defects on or in the extruded product, including spider lines can be reduced or prevented. Consequently, the long axial length "L" and the large volume annular conduit 24a can result in lower operating pressures, better homogenization or mixing of the melt, less wear on the barrel and screw, and can provide high throughputs.

Figure 5:
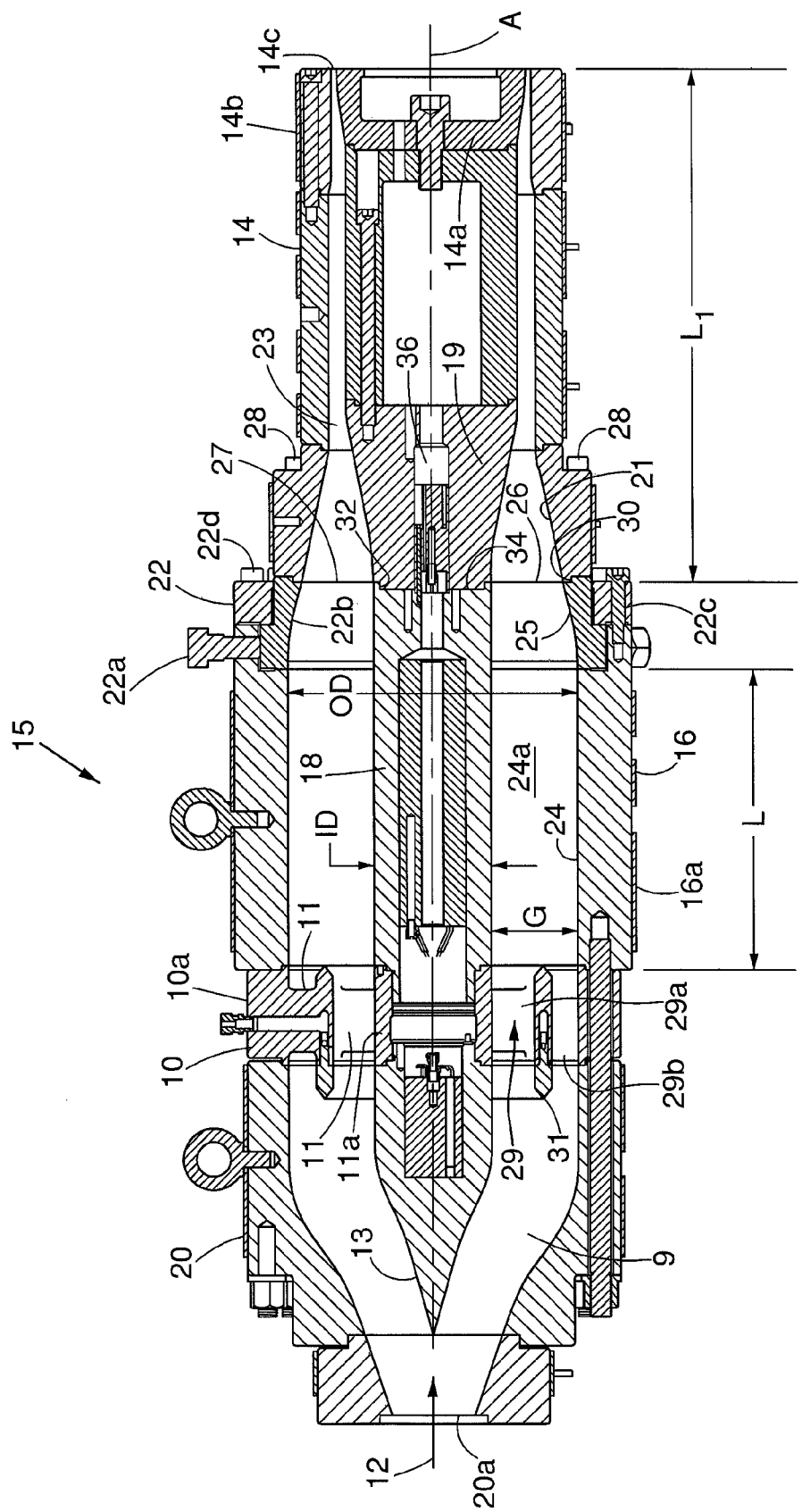
FIG. 5 is a side sectional view of an extrusion head in the present invention having a longer set of dies.
Figure 7:
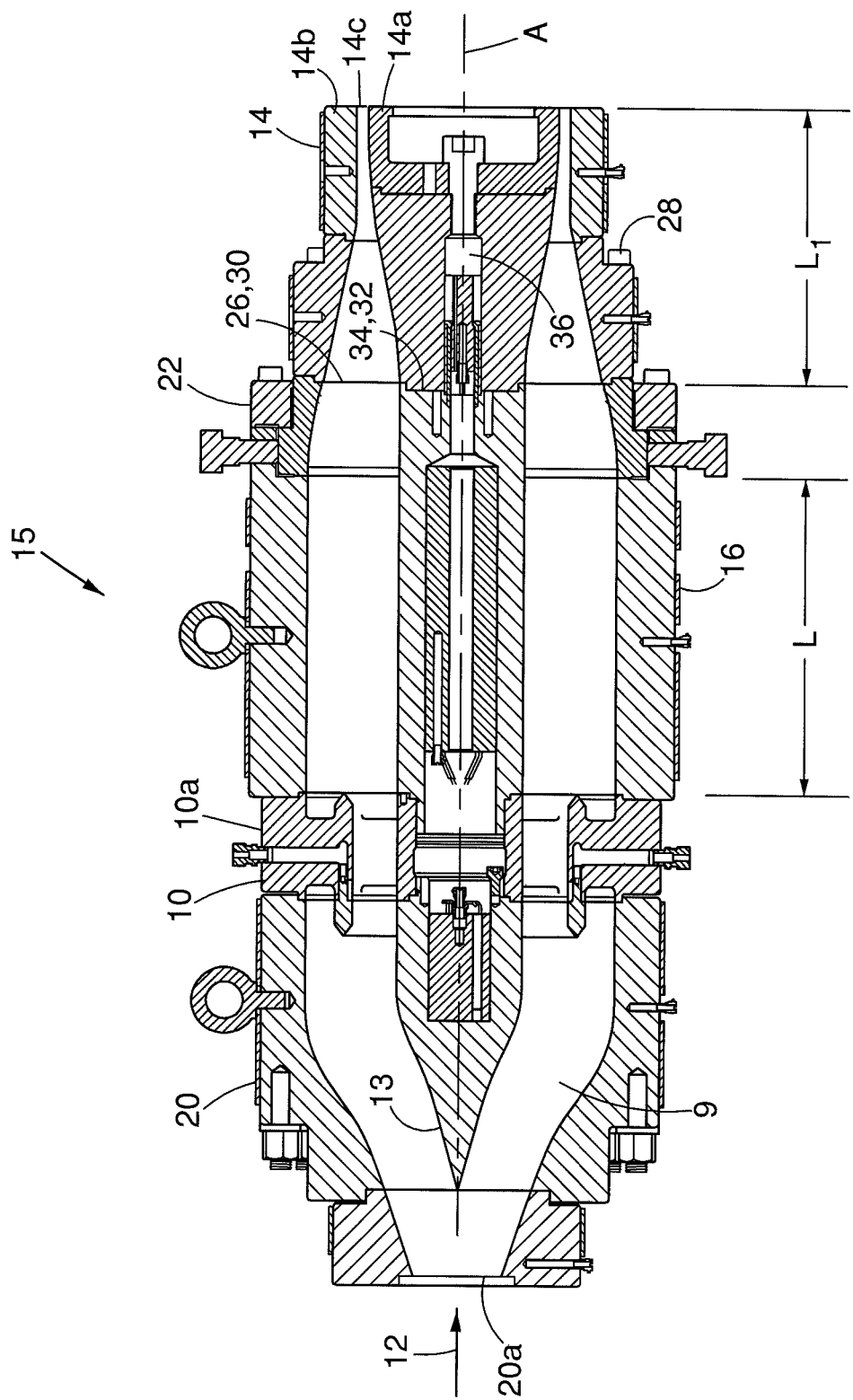
FIG. 7 is a side sectional view of an extrusion head in the present invention having another set of dies.

By providing the increased mixing and the lower pressure of the polymer 12 within the reservoir section 16, the axial flow length $L_1$ of the dies 14 can be made short. In the prior art, dies are typically made with a long axial length to allow mixing of the polymer to occur while flowing within the dies to reduce defects in the extruded product. However, this long length can make the dies expensive, which can be a significant issue since multiple dies are typically used with an extrusion head to produce different sized or shaped products. Consequently, a set of dies 14 in the present invention having a shorter axial length $L_1$ can be less expensive. In addition, the shorter length $L_1$ results in a gap 14c having a shorter length with less volume within the dies 14, which allows for a faster start up and less cleaning time. In the present invention, the axial length $L_1$ of the dies 14 can be sized so that the ratio of the length L of the annular conduit 24a to the length $L_1$ of the dies 14 is less than about 1:2, and can often be about 1:1.5 and 1:1. FIGS. 3 and 7 depict an L:$L_1$ ratio of about 1:1 and FIG. 5 depicts a L:$L_1$ ratio of slightly less than 1:2. The dimensions of reservoir section 16 and conduit 24 can be varied to accommodate different sized dies 14, products 17 and spiders 10, however, the L to OD, OD to ID, L to $L_1$ and the L to G ratios can still be kept similar.

An adjustment assembly 22 can be part of the extrusion head 15, and the outer portion 14b of the dies 14 can be attached to the adjustment assembly 22. The adjustment assembly 22 can include a series of adjustment screws 22a for adjusting the position of a mounting or adjustment ring 22b, which can have a short axial length. Once the ring 22b has been adjusted, it can be clamped and secured in place by an outer clamping or securement ring 22c with a series of screws 22d, and different sets of dies 14 can be secured to and/or removed from the head 15 without further readjustment of the adjustment assembly 22. In prior art systems, typically an adjustment ring is part of the die assembly which is attached to and removed from the extrusion head with the die assembly, such that the adjustment ring requires readjustment every time dies are removed and reattached.

Figure 6:
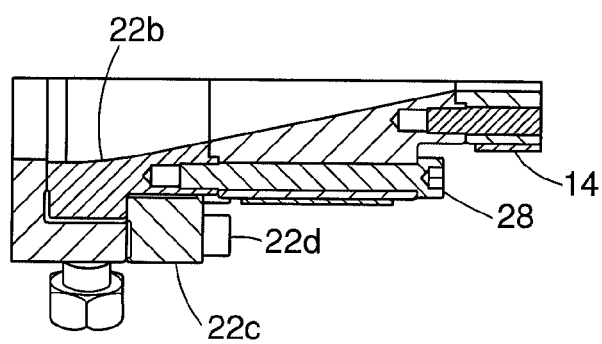
FIG. 6 is an enlarged view of a portion of a die adjustment assembly.

Referring to FIGS. 5 and 6, the upstream axial end of the outer die portion 14b can have a centering protruding locating male structure, shoulder or round diameter 26 which can engage a mating centering recessed locating female structure, hole, round diameter or shoulder 30 on the mounting ring 22b for centering the outer die portion 14b on the ring 22b relative to, about or along axis A before locking or securement with a series of screws 28. In addition, the inner die portion 14a can have a centering protruding locating male structure, shoulder or round diameter 34 which can engage a centering recessed locating female structure hole, round diameter or shoulder 32 for centering the inner die portion 14a on the mandrel 18 about or along axis A before locking or securement with screw 36. The locating diameters 26, 30, 32 and 34 can have tight tolerances to provide precise locating fits. Once the adjustment assembly 22 is centered relative to, about or along axis A, any set of dies 14, such as of different lengths, shapes, sizes or diameters, can be secured to the mandrel 18 and the ring 22b in a precentered manner. In some embodiments, a precentering fixture can be used for precentering. The mating centering male and female structures or diameters 26/30 and 34/32 can allow centering of any set of dies 14 without readjusting the adjustment assembly 22. In other embodiments, the male and female diameters can be on reversed positions, and other suitable centering shapes or structures can also be employed. With the high volume reservoir section 16 being upstream of the dies 14, the dies 14 can have a short axial length, since a long die length is not needed to smooth out polymer variations or spider lines. This can result in lower tooling costs for shorter dies 14, and quicker and easier die changes.

The inner die portion 14a can have a transition portion 19 where the upstream portion that is secured to the mandrel 18 can start at the same diameter as the mandrel 18 and can expand radially outward. In addition the outer die portion 14b can have a transition portion 21 which can narrow radially inwardly. This can form a narrowed or narrowing annular conduit 23 for passage through the dies 14 and gap 14c. In some embodiments, the ring 22b can also have a transition portion 25 which can narrow from annular conduit 24a before reaching transition portion 21. The transition portions 19, 21 and 25 can form a narrowing passage 27 that is between annular conduit 24a and annular conduit 23. The size shape and configuration of the transition portions 19, 21 and 25 can vary, depending upon the size of annular conduit 24a and the dies 14. FIG. 7 shows extrusion head 15 with a shorter set of dies 14 and a larger gap 14c than seen in FIG. 5, where the ratio of L to $L_1$ is about 1:1 in FIG. 7, and is slightly less than 1:2 in FIG. 5.

While this invention has been particularly shown and described with references to example embodiments thereof, it will be understood by those skilled in the art that various changes in form and details may be made therein without departing from the scope of the invention encompassed by the appended claims. For example, spider 10 can have other suitable configurations than that shown.

What is claimed is:

1. An extrusion head comprising:
   a spider having radially extending webs for supporting a central mandrel;
   a high volume reservoir mounted to the spider on a downstream side of the spider and the radially extending webs, the central mandrel extending into the high volume reservoir, the high volume reservoir having an axially straight annular conduit with a long length L, an inner diameter ID and an outer diameter OD with a large size difference between the ID and OD, forming an OD to ID ratio over 2:1 with a large constant annular gap G therebetween; and a set of dies mounted downstream of the high volume reservoir, whereby the high volume reservoir reduces pressure and promotes homogenization of molten polymer flowing therethrough before reaching the set of dies, in combination with the long length L, and the OD to ID ratio over 2:1 with the large annular gap C of the annular conduit, the high volume reservoir being configured to provide sufficient volume, length, radial space and pressure drop for allowing movement of molten polymer radially between the inner diameter ID and the outer diameter OD for mixing in the radial direction for reducing spider lines formed in the molten polymer by the radially extending webs.

2. The extrusion head of claim 1 in which the annular conduit has an L to G ratio between about 3 and 4 to 1.

3. The extrusion head of claim 1 in which the annular conduit has an OD to ID ratio at least about 2.5:1.

4. The extrusion head of claim 1 in which the set of dies have a length $L_1$, and an L to $L_1$ ratio less than about 1:2.

5. The extrusion head of claim 1 further comprising a die adjustment assembly mounted to a downstream side of the high volume reservoir, the die adjustment assembly being figured such that once adjusted into a centered position, an outer die portion of any set of mating dies can be secured to the die adjustment assembly in a precentered position, the die adjustment assembly comprising a mounting ring that is adjustably lockable relative to the high volume reservoir, the mounting ring has a centering locating diameter capable of engaging a mating centering locating diameter on an outer die portion selected from any set of mating dies in the precentered position once the mounting ring is locked in a position that centers one selected outer die portion.

6. An extrusion head comprising:

a spider having radially extending webs for supporting a central mandrel;

a high volume reservoir mounted to the spider on a downstream side of the spider and the radially extending webs, the central mandrel extending into the high volume reservoir, forming an axially straight annular conduit through the high volume reservoir with a long length L, an inner diameter ID and an outer diameter OD with a large size difference between the ID and OD, forming an OD to ID ratio over 2:1 with a large constant annular gap G therebetween; and a die mount mounted to a downstream side of the high volume reservoir for mounting a set of dies thereto, whereby the high volume reservoir reduces pressure and promotes homogenization of molten polymer flowing therethrough before reaching the die mount, in combination with the long length L, and the OD to ID ratio over 2:1 with the large annular gap G of the annular conduit, the high volume reservoir being configured to provide sufficient volume, length, radial space and pressure drop for allowing movement of molten polymer radially between the inner diameter ID and the outer diameter OD for mixing in the radial direction for reducing spider lines formed in the molten polymer by the radially extending webs.

7. The extrusion head of claim 6 in which the annular conduit has an L to G ratio between about 3 and 4 to 1.

8. The extrusion head of claim 6 in which the annular conduit has an OD to ID ratio at least about 2.5:1.

9. The extrusion head of claim 6 in which a set of dies having an inner die portion and outer die portion are mounted to the die mount, the inner die portion being mounted to the central mandrel and the outer die portion being mounted to a die adjustment assembly.

10. The extrusion head of claim 9 in which the set dies have a length $L_1$, and an L to $L_1$ ratio less than about 1:2.

11. The extrusion head of claim 10 in which the die adjustment assembly is configured such that once adjusted in a central position, an outer die portion of any set of mating dies can be secured to the die adjustment assembly in a precentered position, the die adjustment assembly comprising a mounting ring that is adjustably lockable to the high volume reservoir, the mounting ring has a centering locating diameter capable of engaging a mating centering locating diameter on an outer die portion selected from any set of mating dies in the precentered position once the mounting ring is locked in a position that centers one selected outer die portion.

\* \* \* \* \*

UNITED STATES PATENT AND TRADEMARK OFFICE
CERTIFICATE OF CORRECTION

PATENT NO.       : 8,936,460 B2
APPLICATION NO.  : 12/887084
DATED            : January 20, 2015
INVENTOR(S)      : Wallen et al.

Page 1 of 1

It is certified that error appears in the above-identified patent and that said Letters Patent is hereby corrected as shown below:

In the Claims

Column 7, Claim 1, line 10 delete "C" and insert --G--

Column 7, Claim 5, line 27 delete "figured" and insert --configured--

Signed and Sealed this
Nineteenth Day of May, 2015

Michelle K. Lee
*Director of the United States Patent and Trademark Office*